(12) United States Patent
Nethercutt et al.

(10) Patent No.: US 9,207,142 B2
(45) Date of Patent: Dec. 8, 2015

(54) ENGINE VENTILATION SYSTEM DIAGNOSTICS USING PRESSURE MEASUREMENT

(75) Inventors: Jeremiah Nethercutt, Morgantown, IN (US); Debangshu Sadhukhan, Columbus, IN (US)

(73) Assignee: Cummins Inc., Columbus, IN (US)

(*) Notice: Subject to any disclaimer, the term of this patent is extended or adjusted under 35 U.S.C. 154(b) by 588 days.

(21) Appl. No.: 13/477,716

(22) Filed: May 22, 2012

(65) Prior Publication Data

US 2013/0312493 A1 Nov. 28, 2013

(51) Int. Cl.
*G01M 3/04* (2006.01)
*G01M 3/28* (2006.01)
*G01M 3/02* (2006.01)

(52) U.S. Cl.
CPC ............... *G01M 3/28* (2013.01); *G01M 3/025* (2013.01)

(58) Field of Classification Search
CPC .............................................. F02D 2200/0406
USPC ...................................................... 73/114.37
See application file for complete search history.

(56) References Cited

U.S. PATENT DOCUMENTS

| | | | |
|---|---|---|---|
| 5,792,949 A | 8/1998 | Hewelt et al. | |
| 5,897,597 A | 4/1999 | O'Daniel | |
| 6,779,388 B2 | 8/2004 | Baeuerle et al. | |
| 6,779,516 B1 | 8/2004 | Shureb | |
| 7,426,924 B2 | 9/2008 | Withrow et al. | |
| 7,567,867 B2 | 7/2009 | Herz et al. | |
| 7,886,727 B2* | 2/2011 | Ulrey et al. | 123/568.15 |
| 2001/0047801 A1 | 12/2001 | Baeuerle et al. | |
| 2010/0031936 A1* | 2/2010 | Ofner | 123/559.1 |
| 2010/0071676 A1 | 3/2010 | Arvan | |
| 2010/0147270 A1* | 6/2010 | Pursifull et al. | 123/521 |
| 2011/0023852 A1* | 2/2011 | Yamashita | 123/574 |

* cited by examiner

*Primary Examiner* — Hezron E Williams
*Assistant Examiner* — Mark A Shabman
(74) *Attorney, Agent, or Firm* — Taft, Stettinius & Hollister LLP

(57) ABSTRACT

A system comprising an engine including a chamber; an air intake coupled to the engine; a pressure sensor disposed in fluid communication with the air intake and disposed between the air intake and the chamber; and a processor configured to determine a breach in a ventilation system of the chamber in response to the pressure sensor.

11 Claims, 6 Drawing Sheets

_US 9,207,142 B2_

ENGINE VENTILATION SYSTEM DIAGNOSTICS USING PRESSURE MEASUREMENT

BACKGROUND

The technical field generally relates to engine ventilation system diagnostics and, in particular, to pressure measurements used in engine ventilation system diagnostics.

Internal combustion engines can include ventilation systems designed to direct combustion gasses that have leaked past seals, rings, or the like. The gasses can be directed by the ventilation system into the engine. However, a breach in the ventilation system can release the gasses into the atmosphere.

Therefore, further technological developments are desirable in this area.

SUMMARY

One embodiment is a unique system comprising an engine including a chamber; an air intake coupled to the engine; a pressure sensor disposed in fluid communication with the air intake and disposed between the air intake and the chamber; and a processor configured to determine a breach in a ventilation system of the chamber in response to the pressure sensor.

Other embodiments include unique methods, systems, and apparatus to diagnose an engine ventilation system using a pressure measurement. Further embodiments, forms, objects, features, advantages, aspects, and benefits shall become apparent from the following description and drawings.

DESCRIPTION OF THE ILLUSTRATIVE EMBODIMENTS

Figure 1:
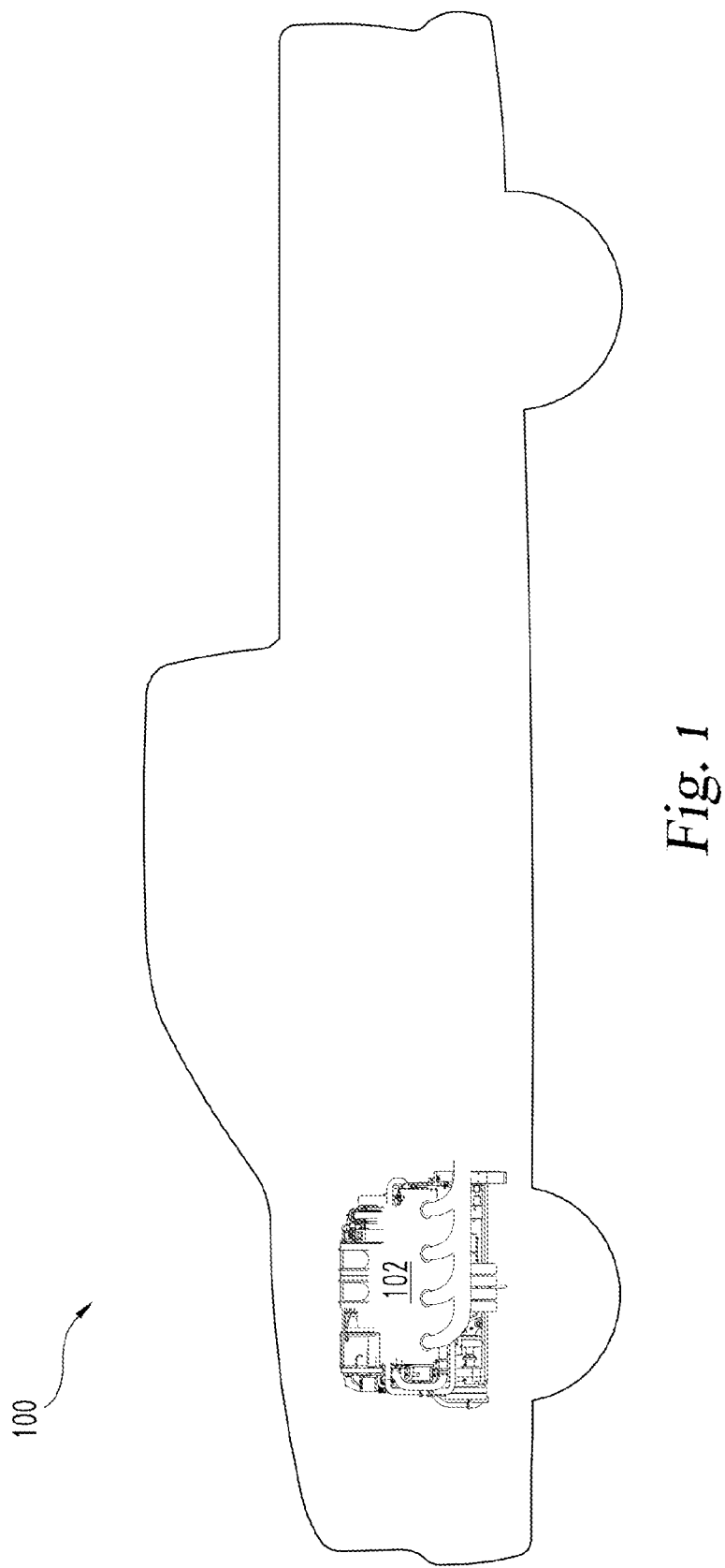
FIG. 1 is a diagram of a vehicle according to an embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a diagram of a vehicle according to an embodiment. In this embodiment, the vehicle 100 includes an engine system 102 configured to provide power for the vehicle. The engine system 102 can include the ventilation system and diagnostics described herein. Although a truck has been illustrated, the vehicle can be any type that can use an engine system 102 with a ventilation system. Furthermore, in an embodiment, the engine system 102 can, but need not directly provide locomotive power for the vehicle 100. For example, the engine system 102 can be configurable to drive an electric motor and/or generator.

Figure 2:
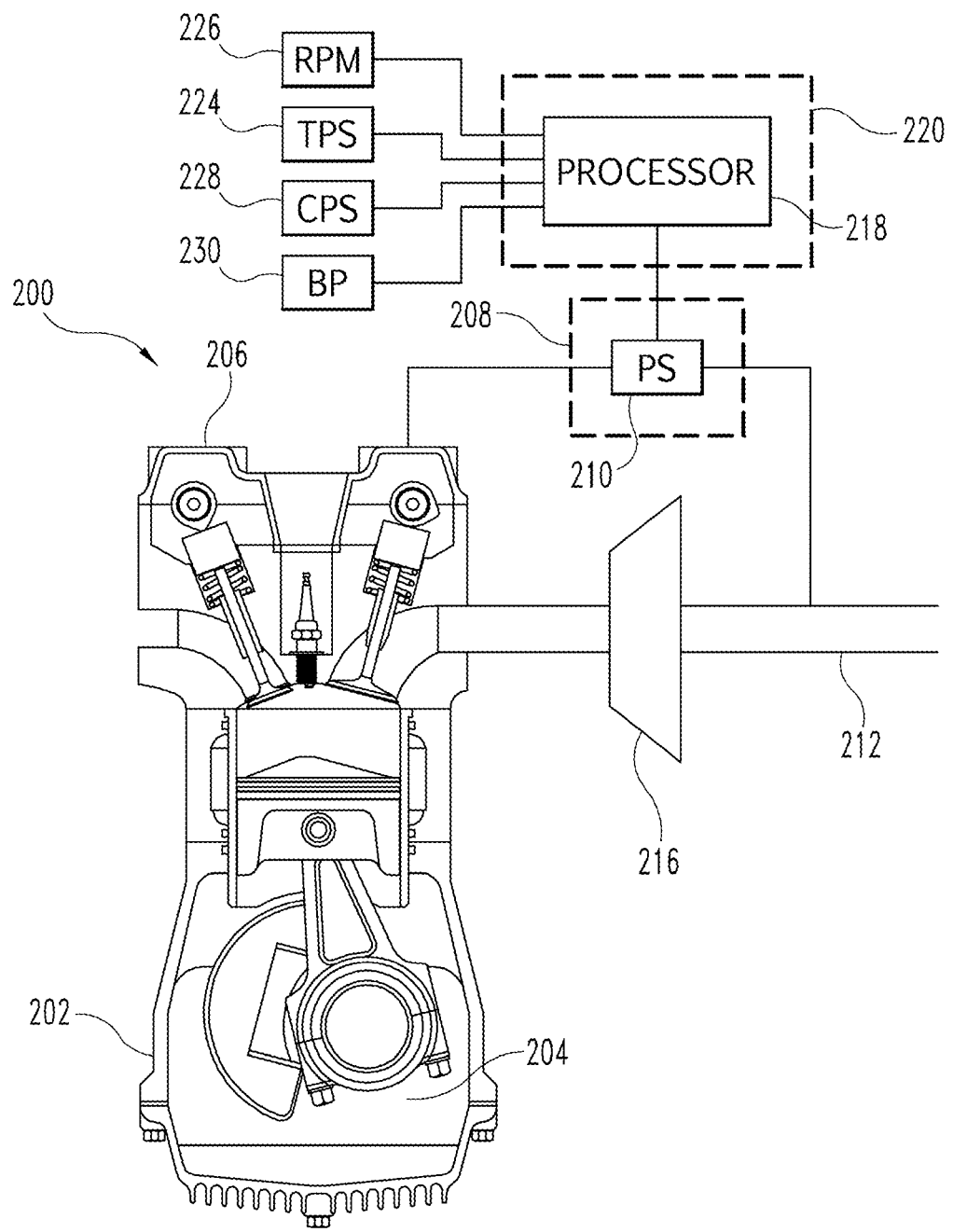
FIG. 2 is a diagram of an engine system with a ventilation system according to an embodiment.

FIG. 2 is a diagram of an engine system with a ventilation system according to an embodiment. In this embodiment, the engine system 200 includes an engine 202 with a valve cover 206. Air is supplied from the air intake 212 to the engine 202 through a compressor 216. The compressor 216 is configured to compress air from the air intake 212.

As illustrated in this embodiment, the ventilation system 208 is coupled between the valve cover 206 and the air intake 212. However, the ventilation system 208 can be coupled to a chamber of the engine 202 in a variety of ways. For example, the ventilation system can be coupled to the crankcase 204. Accordingly, the ventilation system 208 can be in fluid communication with the crankcase 204. Although a crankcase 204 has been used as an example, any chamber of the engine 202 into which combustion gases can leak can be ventilated with the ventilation system 208 or other ventilation systems described herein.

In an embodiment, the ventilation system 208 is coupled to the air intake 212. In particular, the ventilation system 208 can be coupled to anywhere on an upstream side of the compressor 216 where an amount of vacuum can be generated. For example, the ventilation system 208 can be coupled to an inlet of the compressor 216, between the compressor 216 and an air filter (not illustrated), or the like. Although a compressor 216 has been illustrated, in another embodiment, the ventilation system 208 can be coupled to a throttle body, upstream of the throttle body, or the like in an normally aspirated engine. Regardless, the ventilation system 208 can be in fluid communication with the air intake 212.

The ventilation system 208 includes a pressure sensor 210. The pressure sensor 210 is disposed in fluid communication with the air intake 212 and disposed between the air intake 212 and the crankcase 204. The pressure sensor 210 can be configured to measure an amount of vacuum. Although the pressure sensor 210 is illustrated as inline with the ventilation system 208, the pressure sensor 210 can be offset from the ventilation system 208, connected with a pitot tube, or the like, yet still in fluid communication with the ventilation system 208.

In an embodiment, when the compressor 216 is active, an amount of vacuum is produced in the air intake 212. The pressure sensor 210 can be coupled to the air intake 212 through hoses, pipes, fittings, or the like of the ventilation system 208. If the connection is intact, the vacuum is communicated to the pressure sensor 210. However, if there is a breach in the ventilation system between the pressure sensor 210 and the air intake 212, the vacuum will not be communicated, and the pressure sensor 210 can sense a higher pressure, including an ambient pressure. This difference in pressure can be used to determine a fault in the ventilation system 208.

For example, a processor 218 can be coupled to the pressure sensor 210. The processor 218 can be configured to determine a breach in a ventilation system 208 in response to the pressure sensor 210. The processor 218 can be any variety of processor. For example, the processor 218 can include a general purpose processor, a microcontroller, an application specific integrated circuit, a programmable logic device, a combination of such devices, or the like.

In this embodiment, the processor 218 is part of an onboard diagnostic (OBD) system 220. The OBD system 220 can include inputs from other sensors such as a throttle position sensor 224, an engine speed sensor 226, a crankshaft position sensor 228, a boost pressure sensor 230, or the like. As will be described in further detail below, the processor 218 can be configured to use signals from such sensors in determining a breach in the ventilation system 208.

In an embodiment, the processor 218 can be configured to filter a signal from the pressure sensor 210. In an embodiment, a low pass filter, averaging filter, or the like can be used. However, in another embodiment, non-time based filtering can be used. For example, the pressure sensor 210 signal can be gated by engine load, acceleration, whether the engine 202 is operating in a steady state, or the like. The filtered pressure signal can be used to determine a breach in the ventilation system 208.

An embodiment can include means for measuring an amount of vacuum within a ventilation system 208 between a chamber of an engine and an air intake. An example of such means includes the pressure sensor 210, other pressure sensors as described herein, and other similar structures.

An embodiment can include means for determining a breach in the ventilation system 208 in response to the amount of vacuum. The processor 218 and other similar circuitry can be configured to determine the breach in response to the pressure sensor 210.

Although a compressor 216 has been illustrated as directly coupled to the engine 202, other associated components can be part of the engine system 200. For example, a turbine coupled to the exhaust to drive the compressor 216, a throttle, intercooler, or the like can be part of the engine system 200 but were omitted for ease of illustration.

An amount of vacuum has been used to describe a condition sensed by the pressure sensor 210. The sensed condition can, but need not be a vacuum. For example, the sensed condition can be an absolute pressure, a relative pressure, or the like. In an embodiment, any sensed condition that can indicate whether a pressure in the air intake 212 is substantially communicated to a location within the ventilation system 208 can be used to determine a breach in at least the section of the ventilation system 208 between the location and the air intake 212.

Figure 3:
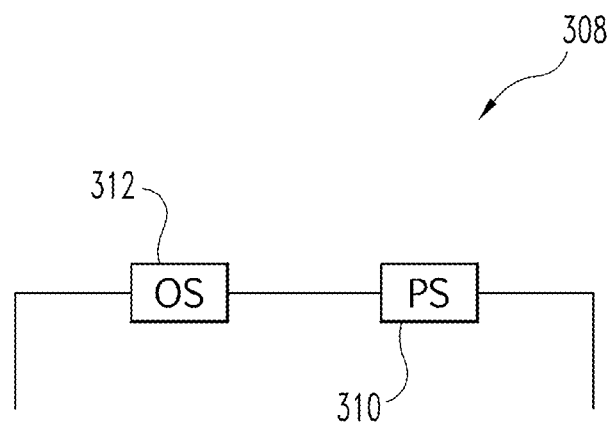
FIG. 3 is a diagram of a ventilation system according to an embodiment.

FIG. 3 is a diagram of a ventilation system according to an embodiment. In this embodiment, the ventilation system 308 includes an oil separator 312 and a pressure sensor 310. As part of the ventilation system 308, the oil separator 312 can be disposed between the crankcase 204 and the air intake 212.

The oil separator 312 can be any variety of devices. For example, the oil separator 312 can be a filter, baffles, screens, or the like. Although illustrated as separate from the engine 202, the oil separator 312 can be part of the engine 202, such as being integrated with the valve cover 206 or other structure of the engine 202. However, even when so integrated, the oil separator 312 can still be disposed between the crankcase 204 and the air intake 212.

In an embodiment, the pressure sensor 310 is disposed between the oil separator 312 and the air intake 212. Accordingly, a breach between the oil separator 312 and the air intake 212 in the ventilation system 308 can be detected using the pressure sensor 310.

In an embodiment, the oil separator 312 and/or other components between the pressure sensor 310 and the crankcase 204 can be secured with bolts, nuts, or the like such that in operation the attachment is unlikely to become undone. In an embodiment, the oil separator 312 and/or other components can be rigidly coupled to the engine 202.

However, the connections of the ventilation system 308 further downstream from the oil separator 312 may not be as securely fastened. In operation, such connections can become loose, leak, rupture, or otherwise vent combustion gasses. According, the pressure sensor 310 can be used to diagnose breaches downstream from such substantially securely or rigidly coupled components.

Figure 4:
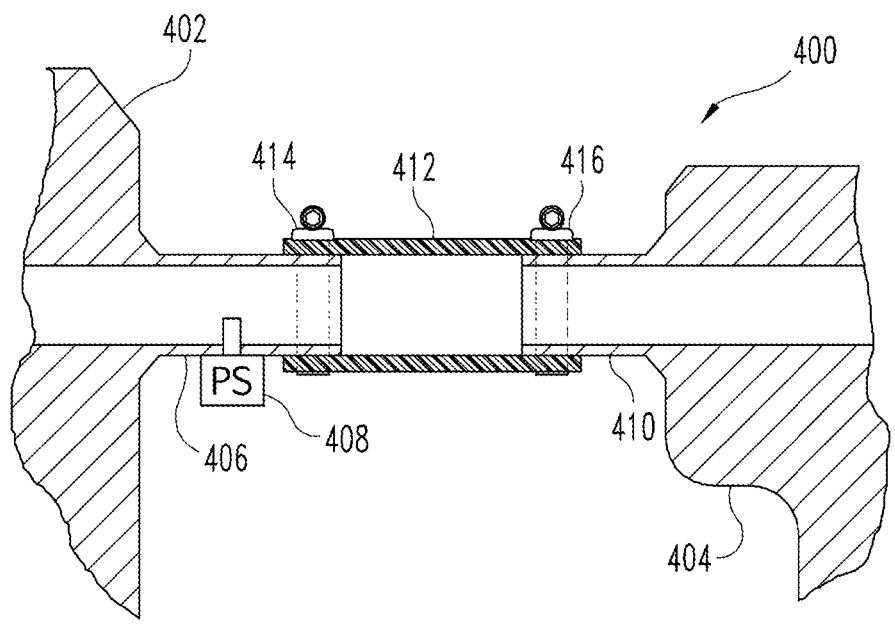
FIG. 4 is a diagram of a connection between a pressure sensor and an air intake according to an embodiment.

FIG. 4 is a diagram of a connection between a pressure sensor and an air intake according to an embodiment. In this embodiment, the ventilation system 400 can include a housing 402 with a fitting 406. The housing 402 can be the oil separator 312, valve cover 206, or the like described herein, or other component upstream towards the crankcase 204. The fitting 406 can include a barb, nipple, or other structure for attaching a hose, pipe, or the like.

The pressure sensor 408 can be disposed in the housing 402. In this embodiment, the pressure sensor 408 is disposed in the fitting 406; however, the pressure sensor could be in line with the housing 402, fitting 406, or the like.

The ventilation system 400 also includes a second housing 404 including a fitting 410. For example, the second housing 404 can be a housing of an inlet of a compressor, an air intake pipe, or the like. The fitting 410 can be similar to the fitting 406; however, in another embodiment, the fitting 410 need not be the same.

A hose 412 can be coupled to the fittings 406 and 410. The connection can be formed using hose clamps 414 and 416, barbs of the fittings, a combination of such or similar techniques, or the like. As a result, the hose 412 and connections to the hose 412 can substantially seal a passage from the pressure sensor 408 to the housing 404. However, as such connections can be used where the attached components can move relative to one another, such connections can fail. Furthermore, such connections may be disconnected during maintenance, repair, or the like to access other parts and may be inadvertently left disconnected. Accordingly, an amount of vacuum from the second housing 404 would not propagate to the pressure sensor 408 and a fault can be detected. In other words, in an embodiment, the pressure sensor 408 can be disposed to sense a pressure in the ventilation system 400 at a location towards the crankcase 204 where, between the pressure sensor 408 and the crankcase 204, the connections, seals, or the like of the ventilation system 400 are more rigid and/or are less likely to fail in operation than those downstream from the pressure sensor 408.

Although one hose 412 has been illustrated, connections between the pressure sensor 408 and the housing 404 can include multiple connections, multiple types of conduits, or the like. For example, a hose can couple the housing 402 to a rigid pipe, which is in turn coupled by another hose to the housing 404.

Referring back to FIG. 3, an embodiment can include means for separating oil from a gas in the ventilation system 308. The means for separating can include a separate oil separator 312, structures within the valve cover 206, or other similar structures to separate oil from combustion gasses in the crankcase 204.

Figure 5:
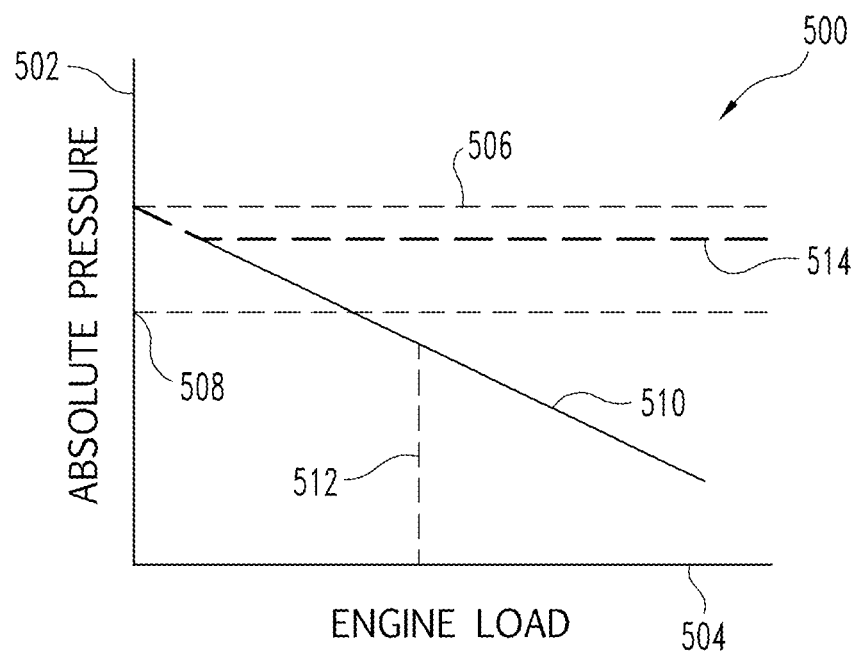
FIG. 5 is a graph of pressure versus load according to an embodiment.

FIG. 5 is a graph of pressure versus load according to an embodiment. Graph 500 illustrates an example of pressure 502 versus engine load 504. Axis 502 illustrates absolute pressure. Thus, a decreasing value is an increasing amount of vacuum. Curve 510 illustrates an example of an amount of vacuum sensed by a pressure sensor described above when there is not a breach.

Line 506 illustrates an ambient pressure. Line 508 illustrates a threshold pressure or amount of vacuum. Line 512 illustrates a threshold engine load. In an embodiment, this threshold can be an amount of vacuum, a pressure that is less than ambient, or the like.

Referring to FIGS. 2 and 5, in an embodiment, if the amount of vacuum is greater than or equal to the threshold 508, the processor 218 can be configured to determine that the ventilation system 208 has not failed. For example, curve 510 can represent an output of the pressure sensor 208. In some conditions, the amount of vacuum indicated by curve 510 is greater than the threshold 508. That is, a vacuum from the air intake 212 is communicated to the pressure sensor 210, indicating that there is not a breach.

In contrast, curve 514 represents a condition where there is a breach in the ventilation system 208. Accordingly, a vacuum in the air intake 212 is not substantially communicated to the pressure sensor 210. As the sensed amount of vacuum is less than the threshold 508, a determination can be made that there is a breach in the ventilation system 208.

In an embodiment, during some operating conditions, the sensed pressure can enter a region were a fault would otherwise be indicated. For example, under lower engine load conditions, an amount of vacuum at the air intake 212 may be less than the threshold 508. Thus, even if the vacuum is perfectly communicated to the pressure sensor 210, the amount of the vacuum would be less than the threshold 508, potentially indicating a fault.

Accordingly, the engine load can be used in the determination of a breach. For example, an engine load threshold 512 can be used where pressure readings obtained when the load is less than the threshold 512 are disregarded. Although one threshold has been illustrated, any number of thresholds of the engine load can be used depending on an expected vacuum at the air intake 212.

The load of the engine 202 can be determined in a variety of ways. For example, a throttle position, an engine speed, a manifold pressure, a boost pressure, a combination of such conditions, or the like can be used to indicate the engine load. Although engine load has been used as the axis 504 and used as an example, any engine parameter that, when varied, has a range associated with an intake vacuum greater than a threshold can be used to diagnose the ventilation system 208. That is, in an embodiment, the parameter can be used to gate the pressure signal so that the pressure is not used when the pressure signal may indicate a false positive and/or false negative.

Figure 6:
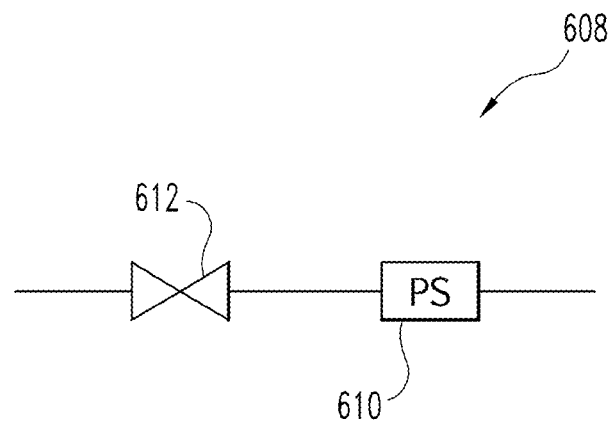
FIG. 6 is a diagram of a ventilation system according to another embodiment.

FIG. 6 is a diagram of a ventilation system according to another embodiment. In this embodiment, the ventilation system 608 includes a valve 612. For example, the valve 612 can be a crankcase depression regulator valve configured to limit an amount of vacuum applied to the crankcase 204.

The pressure sensor 610 can be disposed between the valve 612 and the air intake 212. Accordingly, an operation of the valve can have a reduced, if not eliminated effect on the propagation of the vacuum from the air intake 212 to the pressure sensor 610.

Although a valve 612 has been used as an example, the pressure sensor 610 can be disposed on the air intake 212 side of any structure that can limit the propagation of pressure changes to the pressure sensor 610. For example, the pressure sensor 610 can be disposed between the air intake 212 and an orifice, a restriction, or the like.

An embodiment can include means for limiting a vacuum of the chamber. As described above, a valve, orifice, restriction, or the like can limit the vacuum of the crankcase 204. The means for limiting the vacuum can include such devices and/or structures, or the like.

Figure 7:
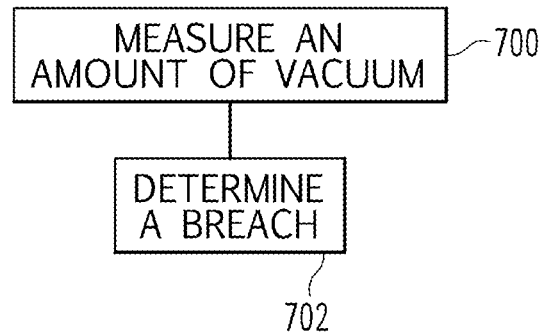
FIG. 7 is a flowchart of a diagnostic technique according to an embodiment.

FIG. 7 is a flowchart of a diagnostic technique according to an embodiment. In an embodiment, in 700 an amount of vacuum within a ventilation system between a chamber of an engine and an air intake is measured. As described above, the amount of vacuum can be measured with one or more pressure sensors disposed in fluid communication with the ventilation system. In 702, a breach in the ventilation system can be determined in response to the amount of vacuum. As described above, if the amount of vacuum is below a threshold, the lack of vacuum can indicate a breach. As described above, part of measuring the amount of vacuum can include filtering the measured amount.

Figure 8:
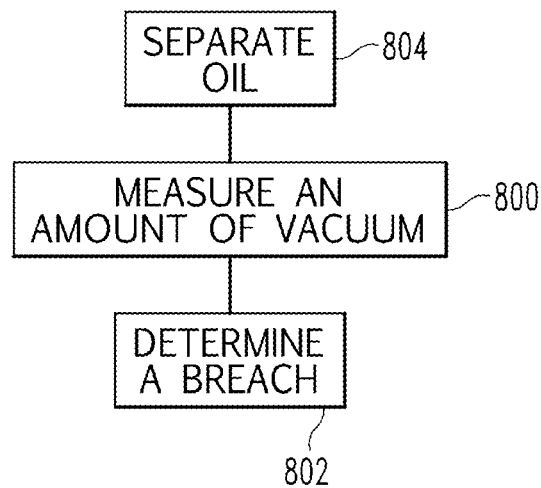
FIG. 8 is a flowchart of a diagnostic technique according to another embodiment.

FIG. 8 is a flowchart of a diagnostic technique according to another embodiment. In this embodiment, in 804, oil is separated from a gas in the ventilation system. As described above, the separation can be performed by an oil separator, filter, baffles, or the like. After the separation in 804, the amount of vacuum within the ventilation system can be measured in 800 and a determination of a breach made in 802.

Figure 9:
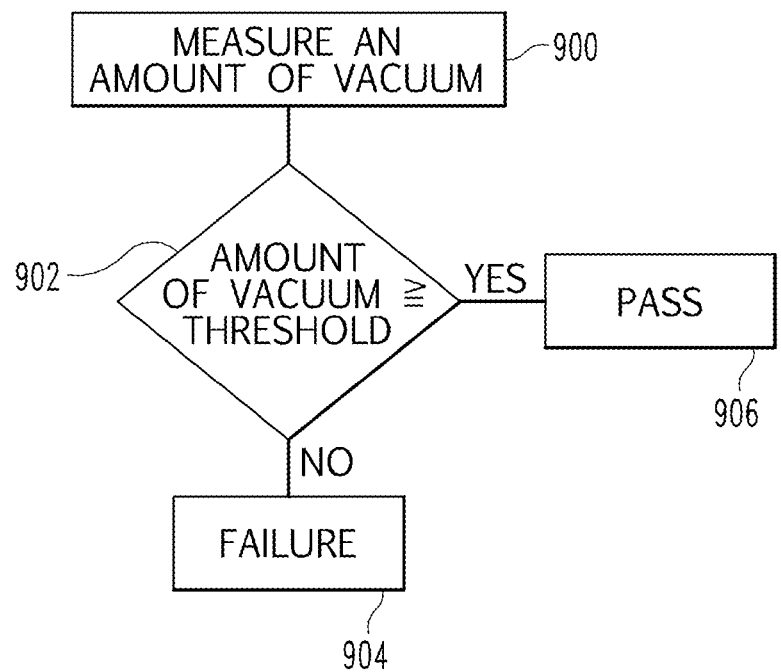
FIG. 9 is a flowchart of a diagnostic technique according to another embodiment.

FIG. 9 is a flowchart of a diagnostic technique according to another embodiment. In this embodiment, the amount of vacuum is measured in 900. The amount of vacuum is compared with a threshold in 902. Based on the comparison, a determination can be made whether there is a failure in 904 or whether the system has passed in 906.

For example, if the amount of vacuum is less than the threshold, a determination of a failure of the ventilation system can be made in 904. If the amount of vacuum is greater than or equal to the threshold, a determination cam be made in 906 that there is not a failure of the ventilation system.

As described above, the vacuum propagated from the air intake to a chamber of the engine can be limited. The measuring of the amount of the vacuum can be performed in a manner substantially independent of the limiting of the vacuum of the chamber. That is, the amount of vacuum can be measured in 900 at a location towards the air intake from a limiting structure. Alternatively, the amount of vacuum can be measured in 900 during a period when the vacuum is not limited. Thus, the measurement can remain substantially independent of the limiting of the vacuum.

Figure 10:
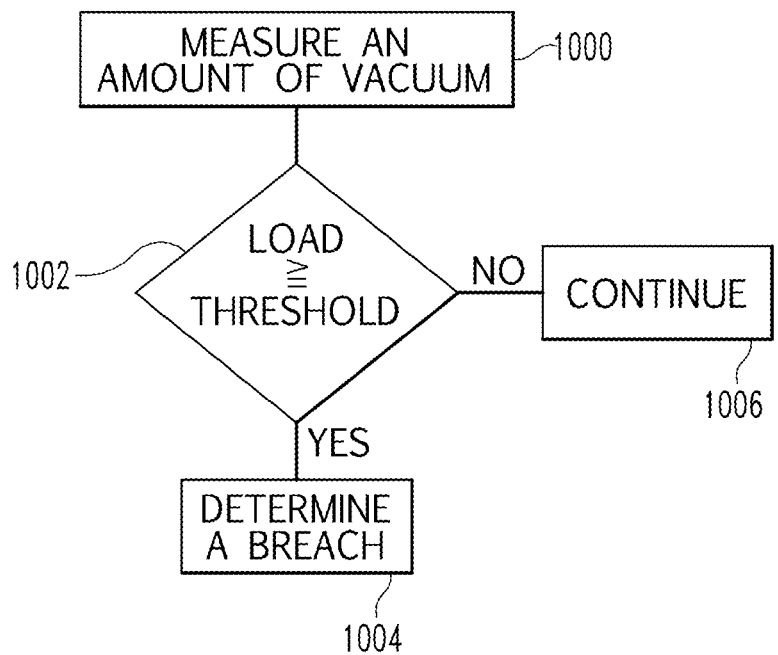
FIG. 10 is a flowchart of a diagnostic technique according to another embodiment.

FIG. 10 is a flowchart of a diagnostic technique according to another embodiment. In this embodiment, in 1000, an amount of vacuum is measured. In 1002, an amount of vacuum expected to be produced by the engine is compared against a threshold.

Although an expected amount of vacuum is used explicitly, the comparison can occur through a proxy for the expected vacuum. As described above, various engine parameters can act as a proxy for an expected vacuum. The comparison of one or more of these parameters with one or more thresholds can be the comparison in 1002.

The amount of vacuum is compared in 1002 to see if it is greater than or equal to a threshold. In an embodiment, the threshold can be an amount of vacuum greater than a threshold used to determine a breach in the ventilation system. If a sufficient vacuum is not expected, then the process can continue in 1006 without making a determination. Alternatively, if there is a sufficient expected amount of vacuum, a determination of whether there is a failure can be made in 1004.

Although the terms greater than, less than, and equal have been used with respect to an amount of vacuum, any such comparison can be appropriately performed when pressure is measured in other ways. For example, if pressure is measured as an absolute pressure, for an amount of vacuum that is greater than or equal to a threshold, the absolute pressure would be less than or equal to the threshold.

Although particular sequences of various operations have been given, unless explicitly stated, such operations can be performed in various orders, continuously or discretely, serially or in parallel, or the like.

Although a breach has been used as an example of a failure, not all failures are breaches and not all breaches are failures. For example, a clogged ventilation system can result in the vacuum of the air intake not propagating to the pressure sensor. The ventilation system would not be breached, yet it is not operating correctly and may vent combustion gasses if pressure in the crankcase builds beyond a limit.

In another example, a breach can be present in the ventilation system; however, a sufficient vacuum prevents escape of combustion gasses, and/or the released combustion gasses are relatively insignificant. In such circumstances, a breach may not be interpreted as a failure.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
    an engine including a chamber;
    an air intake coupled to the engine, the air intake including a compressor connected to the chamber to compress air from the air intake for supply to the chamber;
    a ventilation system connecting the chamber to the air intake upstream of the compressor, the ventilation system including a pressure sensor disposed in fluid communication with the air intake and disposed in a line connecting the air intake at an upstream side of the compressor to the chamber and bypassing the downstream side of the compressor so that an output from the pressure sensor measures an amount of vacuum produced by the compressor in the air intake upstream of the compressor; and
    a processor configured to determine a breach in a ventilation system of the chamber in response to the output from the pressure sensor.

2. The system of claim 1, wherein the processor is configured to receive a signal from the pressure sensor and filter the signal.

3. The system of claim 1, further comprising:
    an oil separator disposed between the chamber and the air intake;
    wherein the pressure sensor is disposed between the oil separator and the air intake.

4. The system of claim 3, wherein the oil separator is a filter.

5. The system of claim 1, wherein at least one fitting substantially seals a passage between the pressure sensor and the air intake.

6. The system of claim 1, wherein the processor is configured to determine if the amount of vacuum is greater than or equal to a threshold in response to the pressure sensor.

7. The system of claim 6, wherein the threshold is a pressure less than an ambient air pressure.

8. The system of claim 1, wherein the processor is configured to determine the breach in the ventilation system of the chamber when the engine is expected to produce the amount of vacuum at the air intake greater than or equal to a threshold.

9. The system of claim 1, wherein the processor is configured to determine the breach in the ventilation system of the chamber in response to a load of the engine.

10. The system of claim 1, further comprising:
    a valve disposed between the chamber and the air intake;
    wherein the pressure sensor is disposed between the valve and the air intake.

11. The system of claim 10, wherein the valve is a crankcase depression regulator valve.

* * * * *